United States Patent
Gehrke et al.

(10) Patent No.: US 9,151,241 B2
(45) Date of Patent: Oct. 6, 2015

(54) REACTIVITY CONTROLLED COMPRESSION IGNITION ENGINE OPERATING ON A MILLER CYCLE WITH LOW PRESSURE LOOP EXHAUST GAS RECIRCULATION SYSTEM AND METHOD

(75) Inventors: Christopher R. Gehrke, Chillicothe, IL (US); Scott B. Fiveland, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 195 days.

(21) Appl. No.: 13/560,416

(22) Filed: Jul. 27, 2012

(65) Prior Publication Data

US 2014/0032082 A1    Jan. 30, 2014

(51) Int. Cl.
*F02M 25/07*        (2006.01)
*F02D 43/00*        (2006.01)
(Continued)

(52) U.S. Cl.
CPC ............ *F02D 43/00* (2013.01); *F02D 13/0238* (2013.01); *F02D 13/0269* (2013.01); *F02D 19/061* (2013.01); *F02D 19/0649* (2013.01); *F02D 19/0689* (2013.01); *F02D 19/0692* (2013.01); *F02D 19/081* (2013.01);
(Continued)

(58) Field of Classification Search
CPC ............ F02D 41/0025; F02D 41/0047; F02D 41/0052; F02D 41/005; F02D 41/0065; F02D 41/0072; F02D 41/0077; F02M 2025/0761; F02M 2025/0762; F02P 5/1516
USPC ............... 123/304, 575, 295, 568.21, 568.31, 123/406.45, 406, 48, 568.11–568.32; 701/105
See application file for complete search history.

(56) References Cited

U.S. PATENT DOCUMENTS 6,619,274 B2    9/2003    Miyashita et al.
6,622,663 B2    9/2003    Weissman et al.
(Continued)

FOREIGN PATENT DOCUMENTS

| EP | 0945606 A2 | 9/1999 |
| JP | 2009-191734 A | 8/2009 |
| WO | WO 2010/075167 A1 | 1/2010 |

OTHER PUBLICATIONS

Lienert, Anita, "Chrysler, Feds Developing Experimental Gasoline-Diesel Engine," *Edmunds Inside Line*, Jun. 7, 2011, downloaded from http://www.insideline.com/chrysler/chrysler-feds-developing-experimental-gasoline-diesel-engine.html on Jun. 21, 2012, 4 pp.
(Continued)

*Primary Examiner* — Lindsay Low
*Assistant Examiner* — Robert Werner
(74) *Attorney, Agent, or Firm* — Leydig, Voit & Mayer, Ltd.

(57) ABSTRACT

An internal combustion engine includes at least one cylinder having a reciprocable piston, an intake system directing intake air to the at least one cylinder, and an exhaust system directing exhaust gasses from the at least one cylinder. A first fuel injector disposed to inject a first fuel into the cylinder, and a second fuel injector disposed to inject a second fuel into said cylinder. At least one intake valve of said cylinder is configured to open and close with a variable timing in accordance with a Miller thermodynamic cycle. An exhaust gas recirculation system, provides exhaust gas to said cylinder through the intake valve. An electronic controller is disposed to monitor and receive at least one input signal indicative of the operating conditions of the internal combustion engine, and adjusts at least the amount of exhaust gas recirculation.

21 Claims, 6 Drawing Sheets

(51) Int. Cl.
    *F02D 41/00* (2006.01)
    *F02D 41/30* (2006.01)
    *F02D 13/02* (2006.01)
    *F02D 19/06* (2006.01)
    *F02D 19/08* (2006.01)
    *F02B 17/00* (2006.01)
    *F02B 29/04* (2006.01)

(52) U.S. Cl.
    CPC ........ *F02D41/0025* (2013.01); *F02D 41/0057* (2013.01); *F02D 41/3047* (2013.01); *F02D 41/3094* (2013.01); *F02M 25/07* (2013.01); *F02M 25/0707* (2013.01); *F02M 25/0709* (2013.01); *F02B 17/005* (2013.01); *F02B 29/0425* (2013.01); *F02D 2041/3052* (2013.01); *F02M 25/074* (2013.01); *F02M 25/0718* (2013.01); *F02M 25/0727* (2013.01); *Y02T 10/142* (2013.01); *Y02T 10/47* (2013.01)

(56) References Cited

U.S. PATENT DOCUMENTS

| | | | |
|---|---|---|---|
| 6,622,664 B2 | 9/2003 | Holder et al. | |
| 6,655,130 B1 | 12/2003 | Kirwan et al. | |
| 6,729,301 B2 | 5/2004 | Nakamori et al. | |
| 6,845,608 B2 | 1/2005 | Klenk et al. | |
| 6,959,693 B2 | 11/2005 | Oda | |
| 7,007,669 B1 | 3/2006 | Willi et al. | |
| 7,195,006 B2 | 3/2007 | Khair et al. | |
| 7,213,573 B2 | 5/2007 | Daniels et al. | |
| 7,231,906 B1 | 6/2007 | Haskara et al. | |
| 7,252,054 B2 | 8/2007 | Weber et al. | |
| 7,263,968 B2 | 9/2007 | Cairns et al. | |
| 7,293,409 B2 | 11/2007 | Sellnau et al. | |
| 7,377,270 B2 * | 5/2008 | Duffy et al. | 123/568.12 |
| 7,409,926 B2 * | 8/2008 | Sun et al. | 123/1 A |
| 7,597,072 B2 | 10/2009 | Stein et al. | |
| 7,690,336 B2 | 4/2010 | Bowman et al. | |
| 7,797,937 B2 * | 9/2010 | Endicott et al. | 60/605.1 |
| 8,042,516 B2 | 10/2011 | Takahashi et al. | |
| 8,616,177 B2 * | 12/2013 | Reitz et al. | 123/304 |
| 2005/0252489 A1 | 11/2005 | Moody | |
| 2007/0289573 A1 | 12/2007 | Leone et al. | |
| 2008/0230041 A1 | 9/2008 | Brusslar et al. | |
| 2010/0198481 A1 | 8/2010 | Bromberg et al. | |
| 2011/0184629 A1 | 7/2011 | Krengel et al. | |
| 2011/0192367 A1 | 8/2011 | Reitz et al. | |
| 2011/0288751 A1 * | 11/2011 | Kurtz | 701/109 |
| 2012/0247421 A1 * | 10/2012 | Reitz et al. | 123/299 |

OTHER PUBLICATIONS

Splitter, Derek et al., "Deer 2011—Heavy Duty RCCI," Univ. of Wisconsin, Engine Research Center, Oct. 5, 2011, 13 pp.

* cited by examiner

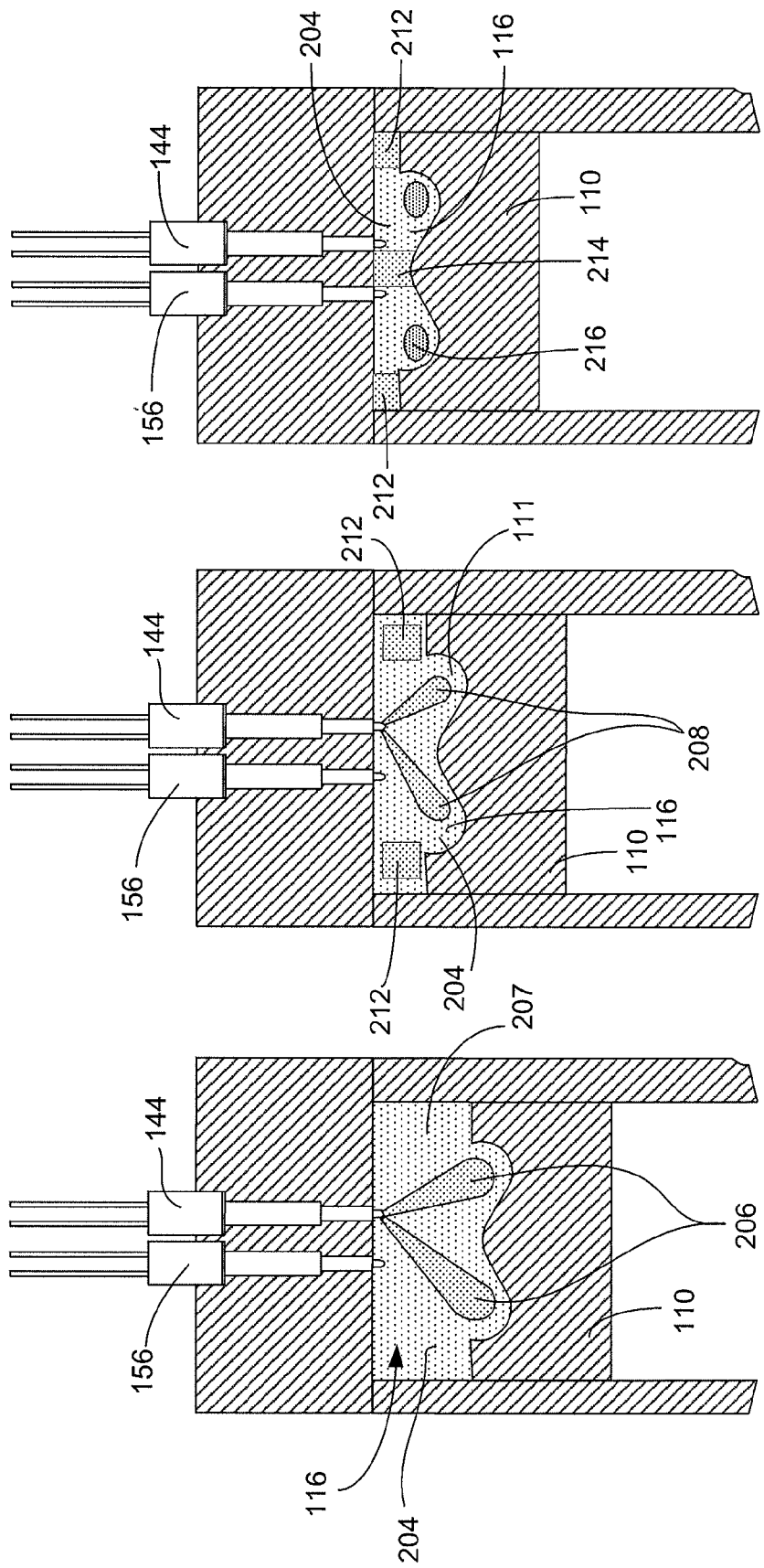

REACTIVITY CONTROLLED COMPRESSION IGNITION ENGINE OPERATING ON A MILLER CYCLE WITH LOW PRESSURE LOOP EXHAUST GAS RECIRCULATION SYSTEM AND METHOD

TECHNICAL FIELD

This patent disclosure relates generally to internal combustion engines and, more particularly, to internal combustion engines operating on a Miller cycle using more than one fuel and having a low pressure loop exhaust gas recirculation system.

BACKGROUND

Internal combustion engines operating with more than one fuel are known. Certain engines use two or more fuels having different reactivities. One example of such an engine can be seen in U.S. Patent Application Pub. No. 2011/0192367, which was published on Aug. 11, 2011 to Reitz et al. (hereafter, "Reitz"). Reitz describes a compression ignition engine that uses two or more fuel charges having two or more reactivities to control the timing and duration of combustion. However, as Reitz describes, engine power output and emissions depend on the reactivity of the fuels, temperature, equivalence ratios and many other variables, which in real-world engine applications cannot be fully controlled. For example, fuel quality may change by season or region, and the temperature of incoming air to the engine depends on the climatic conditions in which the engine operates.

Engine combustion systems that use stratified fuel/air regions in the cylinder having different reactivities, such as that described by Reitz, are known to work relatively well at low engine speeds and loads, where the various strata within the cylinder have a chance to fully develop, but the technology is not proven to work for higher engine loads, where the fuel amounts within the cylinder are increased and/or the incoming air to the cylinder is accelerated. Thus, the combustion system of Reitz may not be suitable for certain engine applications where higher loads are required. Further, such engines require sufficiently low cylinder temperatures to avoid rapid ignition of the gas charge and thus may not be effective at higher operating temperatures.

SUMMARY

The disclosure describes, in one aspect, an internal combustion engine, which includes at least one cylinder having a reciprocable piston, an intake system directing intake air to the at least one cylinder, and an exhaust system directing exhaust gas from the at least one cylinder. A first fuel injector is disposed to inject a first fuel into the cylinder, and a second fuel injector is disposed to inject a second fuel into said cylinder. At least one intake valve of said cylinder is configured to open and close with a variable timing in accordance with a Miller thermodynamic cycle. An exhaust gas recirculation system provides exhaust gas to said cylinder through the intake valve. An electronic controller is disposed to monitor and receive at least one input signal indicative of an ignition timing of the internal combustion engine, and adjust at least the amount of exhaust gas recirculation in response to that signal.

In another aspect, the disclosure describes a method of operating an internal combustion engine configured to utilize fuels having different reactivities. The method includes storing a first fuel with a first reactivity and a second fuel having a second reactivity. The method further includes using an exhaust gas recirculation (EGR) system to mix a portion of engine exhaust gas with intake air to provide an intake air/exhaust gas mixture, and introducing the intake/exhaust gas mixture to a variable volume defined by a piston moving in a cylinder. A first fuel is then introduced into the variable volume at a first time, when the piston is relatively closer to a bottom dead center (BDC) position, followed by a second fuel that is introduced at a second time, when the piston is relatively further from the BDC position. The method includes combusting the first and second fuel charges in the variable volume. Finally, the method includes receiving operating parameters at an electronic controller, the operating parameters being indicative of an ignition timing of the internal combustion engine, and processing the operating parameters in the electronic controller to determine at least one a desired amount of first fuel, a desired amount of second fuel, a desired valve timing, and the portion of exhaust gas that is to be recirculated.

In another aspect, the disclosure describes a method of operating an internal combustion engine configured to utilize fuels having different reactivities in a fashion consistent with a Miller thermodynamic combustion cycle. The method includes storing a first fuel with a first reactivity and a second fuel having a second reactivity. The method includes using an exhaust gas recirculation (EGR) system to mix a portion of engine exhaust gas with intake air and condensing and re-entraining liquid from the EGR system into the intake air to provide an intake air/exhaust gas mixture. The method further includes introducing the intake/exhaust gas mixture to a variable volume defined by a piston moving in a cylinder, then introducing the first fuel into the variable volume at a first time when the piston is relatively closer to a bottom dead center (BDC) position, followed by the second fuel at a second time when the piston is relatively further from the BDC position. The method then includes combusting the first and second fuel charges in the variable volume. Finally, the method includes receiving operating parameters at an electronic controller, the operating parameters being indicative of an ignition timing of the internal combustion engine, and processing the operating parameters in the electronic controller to determine at least one a desired amount of first fuel, a desired amount of second fuel, a desired valve timing, and the portion of exhaust gas that is to be recirculated.

BRIEF DESCRIPTION OF THE DRAWINGS

FIGS. 2-5 are cross sections of an engine cylinder at various operating positions in accordance with the disclosure.

DETAILED DESCRIPTION

This disclosure relates to internal combustion engines and, more particularly, to internal combustion engines that operate using more than one fuel, and to machines or vehicles into which such engine systems may be operating. More specifically, this disclosure relates to an internal combustion engine using more than one fuel and using a low-pressure loop exhaust gas recirculation ("EGR") system. As used herein, a low-pressure loop EGR system is used to describe any exhaust gas recirculation system that recirculates exhaust gas at a pressure that is lower than an exhaust gas pressure that is present at the exhaust valve(s) of engine cylinders. In one described embodiment, the latent heat of vaporization of condensed water vapor in the EGR system is provided to the engine cylinders to lower in-cylinder air temperatures while the engine is operating under a Miller thermodynamic cycle. Miller thermodynamic cycle is a term that generally refers to an engine cycle in which less air is used in the engine cylinders than during a typical Otto cycle. For example, an engine intake valve may be closed before the intake stroke is completed, which is a process commonly referred to as an early intake closing cycle ("EIC"), or may be left open through the first part of the compression stroke, which is a process commonly referred to as a late intake closing cycle ("LIC"). Either of these processes can reduce the air or alter the ratio of an air/fuel mixture within the cylinder.

In one disclosed embodiment, an engine operates using a high reactivity fuel such as diesel in conjunction with a low reactivity fuel such as gasoline, although alternative embodiments in which a single fuel having different reactivities or two other fuels are contemplated. In the various embodiments contemplated, fuels having different reactivities are delivered to engine cylinders by various methods including direct injection of one or more fuels into the cylinder and/or indirect injection methods. Indirect fuel injection methods can be tailored to the particular type of fuel being used. For example, a gaseous fuel such as propane or natural gas can be dispersed into the intake manifold of the engine for mixing with engine intake air, while a liquid fuel such as gasoline can be injected at or close to a cylinder intake port for mixing with air entering the cylinder.

Figure 1:
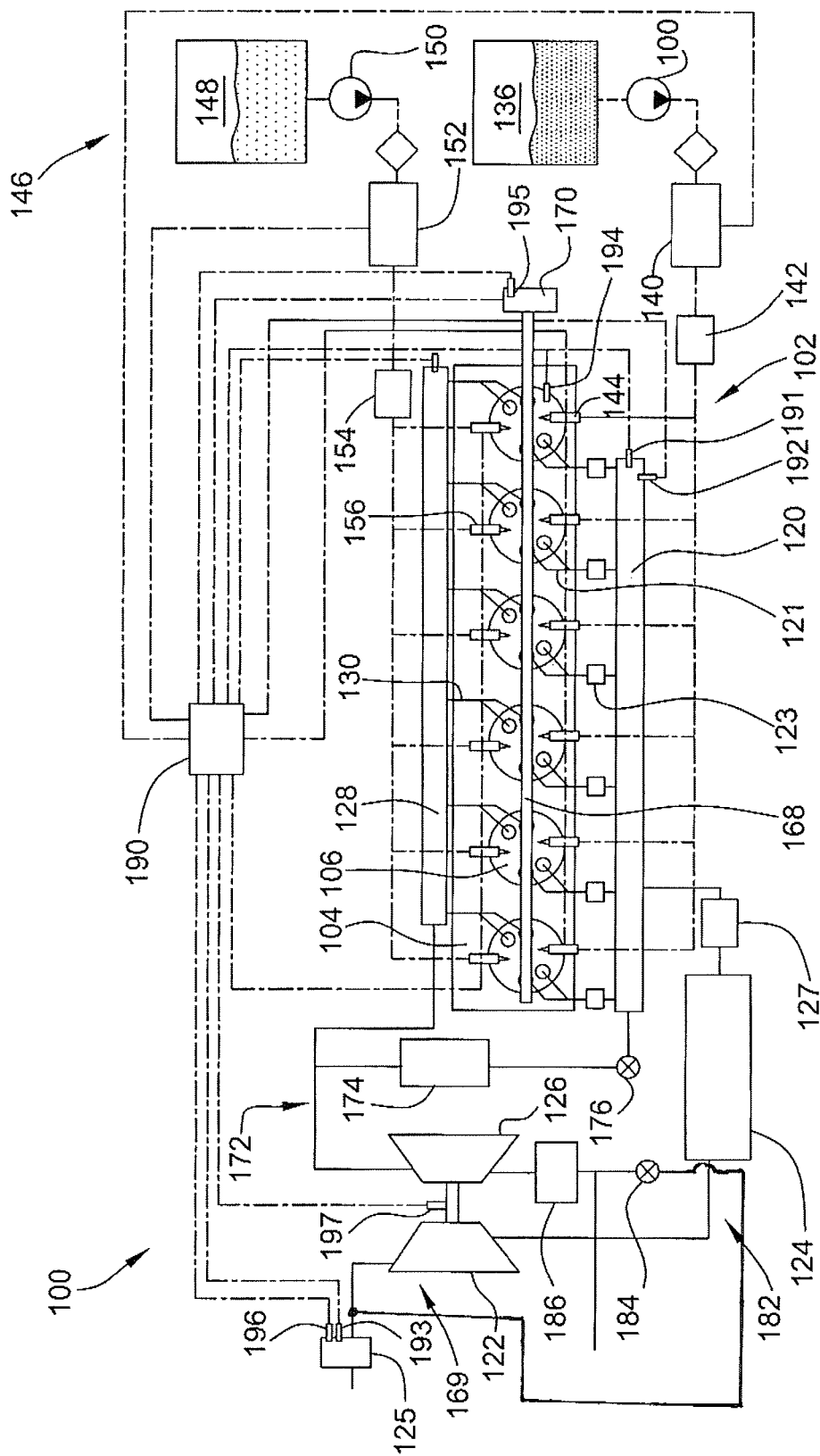
FIG. 1 is a block diagram for an engine system in accordance with the disclosure.
Figure 2:
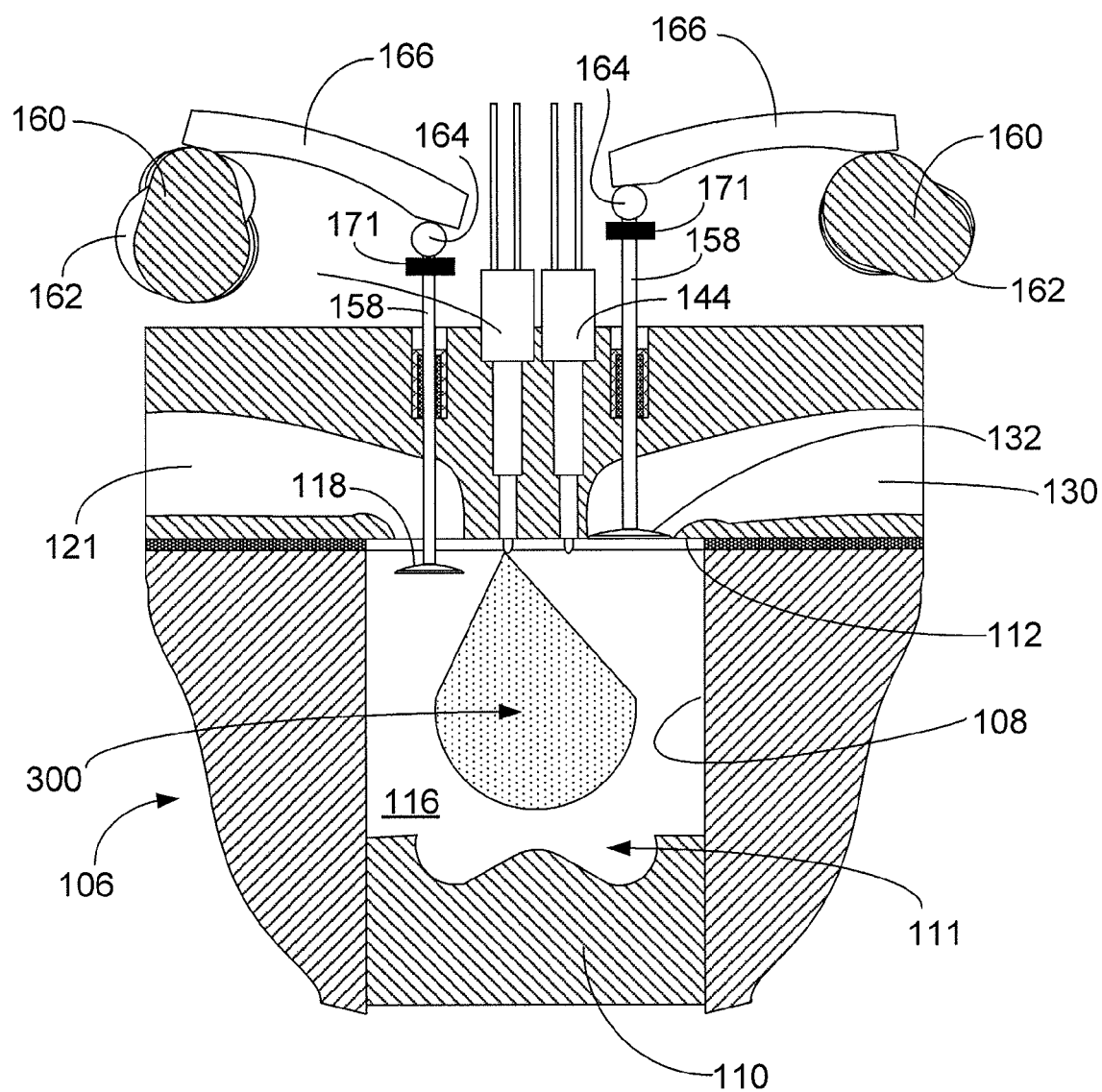

A block diagram for an engine system 100 is shown in FIG. 1. The engine system 100 includes an engine 102 having a cylinder case 104 that forms a plurality of engine cylinders 106. Although six cylinders 106 are shown, fewer or more cylinders arranged in an inline or another configuration such as a V-configuration may be used. As is best shown in FIG. 2, each engine cylinder 106 includes a bore 108 that slidably accepts therein a piston 110. The piston 110 forms a bowl 111 in its crown. A free end of the bore 108 is closed by what is commonly referred to as a flame deck surface 112 of a cylinder head 114. In this way, a variable volume 116 is defined between a top portion of the piston 110, the bore 108 and the flame deck surface 112, which varies as the piston 110 moves between top dead center (TDC) and bottom dead center (BDC) positions within the bore 108.

In the illustrated embodiment, an intake valve 118 selectively fluidly connects the variable volume 116 with an intake manifold or collector 120 (FIG. 1) via an intake runner 121. In the illustrated embodiment, each intake runner 121 includes a cooler 123 that operates as a heat exchanger to remove heat from intake air passing through the intake runner 121. In one embodiment, the coolers 123 use engine coolant as a heat sink but other types of coolers can be used. As best shown in FIG. 1, the intake manifold 120 receives air compressed by a compressor 122, which can optionally also be cooled in an intercooler 124 before entering the intake manifold 120. Air is provided to the compressor 122 through an air filter 125. Power to compress the air in the compressor 122 is provided by a turbine 126, which receives exhaust gas from an exhaust manifold or collector 128. When combustion in each cylinder is complete, exhaust gas from each cylinder 106 is collected in the exhaust manifold 128 from one or more exhaust runners 130, which communicate with and are selectively fluidly connectable with their respective cylinders 106 via exhaust valves 132, which are shown in FIG. 2. Although one intake and one exhaust valve 118 and 132 are shown in the cross section of FIG. 2, more than one intake and exhaust valve can be connected to each cylinder. For example, two intake and two exhaust valves 118 and 132 are shown for each cylinder 106 in FIG. 1.

In the exemplary embodiment of FIG. 1, the engine 102 is configured to operate with first and second fuels having different reactivities such as diesel and gasoline. Both fuels are stored and supplied to the engine independently. Accordingly, a diesel fuel system 134 includes a diesel fuel reservoir 136 that supplies fuel to a diesel fuel pump 138. An optional diesel fuel conditioning module 140 may filter and/or otherwise condition the fuel that passes therethrough, for example, to heat the fuel at low temperature conditions, remove water, and the like. Pressurized diesel fuel is collected in a high-pressure rail or accumulator 142, from where it is provided to a diesel fuel injector 144 associated with each cylinder 106. As is also shown in FIG. 2, the diesel fuel injector 144 associated with each cylinder 106 is configured to inject a predetermined amount of diesel directly into the respective variable volume 116.

For the second fuel, a gasoline fuel system 146 includes a gasoline fuel reservoir 148 that supplies fuel to a gasoline pump 150. As with the diesel fuel, an optional gasoline conditioning module 152 may filter and/or otherwise condition the fuel that passes therethrough. Pressurized gasoline is provided to a high-pressure rail or accumulator 154, from where it is provided to a plurality of gasoline injectors 156, each of which is associated with each cylinder 106 and is configured to inject a predetermined amount of gasoline directly into the respective variable volume 116. In alternative embodiments, the gasoline injectors 156 may be disposed to inject fuel indirectly into the cylinders 106, for example, by providing the fuel into the respective intake runner 121 or by dispersing the gasoline in an aerosol mixture with the intake air within the intake manifold 120 from one or more injection locations (not shown) at a high, intermediate or low pressure. It is noted that, although two fuel injectors 144 and 156 are shown associated with each cylinder 106, a single fuel injector having the capability of injecting two fuels independently (not shown) can be used instead of the two separate injectors shown. For both the diesel and gasoline fuel systems 134 and 146, other additional or optional fuel system components such as low-pressure transfer pumps, de-aerators and the like can be used but are not shown for simplicity.

In reference now to the cross section shown in FIG. 2, the intake and exhaust valves 118 and 132 in one embodiment are actuated by pushrods 158. The pushrods 158 may cause each valve to open or close when a respective lobe 160 of one or more rotatable camshafts 162 pushes onto a respective cam follower 164 via a valve bridge 166 in the known fashion. In the embodiment illustrated, the engine 102 has a variable cam timing, which enables the selective shifting and/or elongation of the opening stroke of the intake valves 118 and the exhaust valves 132. Accordingly, in the embodiment shown in FIG. 1, a single camshaft 168 is caused to rotate during engine operation. A phase angle of the camshaft can be selectively altered via a specialized actuator 170, which is responsive to a command signal. In general, the variable valve timing for the engine 102 can be accomplished in any known way, including the addition of devices and actuators that act on the valve pushrods to keep the respective valve open for a prolonged period or close the valve in an early fashion. Relative to shifting valve timing, various mechanisms can be used. One example of a variable valve timing arrangement that can operate to shift valve timing is described in copending U.S.

patent application Ser. No. 12/952,033, which discusses a mechanism configured to provide a predetermined phase rotation of the camshaft relative to the engine crankshaft that results in a phase shift of valve opening and closing events during engine operation. Another example of a mechanism used for varying valve timing includes actuators or other mechanisms operating to selectively push onto a valve stem to maintain a valve open for a predetermined time regardless of the normal activation of the valve through a regular engine valve activation system such as a cam-follower arrangement. In the illustrated embodiment, a plurality of actuators 171, each associated with an intake and exhaust valve, is shown in FIG. 2. The actuators 171 may be electrically, hydraulically or otherwise actuated in response to control signals provided to the actuators. Although actuators are shown associated with valve stems, any other device that is capable of acting on the pushrods 158 or otherwise affecting valve position to hold the respective intake valve 118 or exhaust valve 132 open and thereby vary the valve timing is contemplated.

The engine 102 includes an exhaust recirculation (EGR) system 169, which operates to mix exhaust gas drawn from the engine's exhaust system with intake air of the engine to displace oxygen and generally lower the flame temperature of combustion within the cylinders. Two exemplary EGR systems 169 are shown associated with the engine 102 in FIG. 1, but it should be appreciated that these illustrations are exemplary and that either one, both, or neither can be used on the engine. It is contemplated that an EGR system 169 of a particular type may depend on the particular requirements of each engine application. In the illustrated embodiment, the engine 102 includes a low pressure loop EGR system 182, but may also include a high pressure loop EGR system as well.

The high-pressure EGR system 172 includes an optional EGR cooler 174 and an EGR valve 176. The EGR cooler 174 and EGR valve 176 are connected in series between the exhaust and intake manifolds 128 and 120. This type of EGR system is commonly referred to as high-pressure loop system because the exhaust gas is recirculated from a relatively high-pressure exhaust location upstream of the turbine 126 to a relatively high-pressure intake location downstream of a compressor 122. In the high-pressure EGR system 172, the exhaust gas is cooled in the EGR cooler 174, which may be embodied as a jacket cooler that uses engine coolant as a heat sink. The flow of exhaust gas is metered or controlled by the selective opening of the EGR valve 176, which can be embodied as any appropriate valve type such as electronically or mechanically actuated valves.

The low-pressure loop ("LPL") EGR system 182 includes an EGR valve 184 that is fluidly connected between a low-pressure exhaust location downstream of the turbine 126 and a low-pressure intake location upstream of the compressor 122. As shown, the exhaust location is further disposed downstream of an after-treatment device 186, which can include various components and systems configured to treat and condition engine exhaust gas in the known fashion, and upstream of the intercooler 124, which can be embodied as an air-to-air cooler, or any other type of suitable cooler, that removes heat from the intake air of the engine. Because the intercooler 124 cools the engine exhaust air moisture previously entrained in the exhaust air tends to condense in the intercooler 124. The condensed liquid from the exhaust air can contain sulfur, nitrogen oxide ("NOx"), and other materials that can be corrosive or damaging to the downstream engine components.

Thus, the LPL EGR system 182 can further include a condensation dispersion device 127 which is capable of dispersing and re-entraining condensed fluid (e.g., water, sulfuric acid, nitric acid, etc.) before it reenters the intake manifold 120. One example of a condensation dispersion device that can operate to disperse and re-entrain the condensed fluid is described in U.S. Pat. No. 7,797,937, which discusses a mechanism configured to disperse and re-entrain liquid in an EGR system. In some embodiments, the gas passing through the LPL EGR system 182 can be used to cool the incoming engine air by utilizing the latent heat of vaporization of the condensed liquid in the recirculated exhaust gas stream.

The engine system 100 further includes an electronic controller 190, which monitors and controls the operation of the engine 102 and other components and systems associated with the engine such as fuel supply components and systems, as well as other structures associated with the engine such as machine components and systems and the like. More specifically, the controller 190 is operably associated with various sensors that monitor various operating parameters of the engine system 100. In FIG. 1, the various communication and command channels associated with the controller 190 are shown in dot-dashed lines for illustration but may be embodied in any appropriate fashion, for example, via electrical conductors carrying analog or digital electrical signals, via informational transfer channels within a local area computer network, via a confined area network (CAN) arrangement, and/or via any other known configuration.

The controller 190 includes various sub-modules as shown and described in more detail below, but it should be appreciated that the functionality of the modules illustrated is not exhaustive. Accordingly, fewer or more functions than those shown may be integrated with the controller 190. Moreover, the controller 190 shown here is an electronic control device or, stated differently, an electronic controller. As used herein, the term electronic controller may refer to a single controller or may include more than one controller disposed to control various functions and/or features of the engine. For example, a master controller, used to control systems associated with the engine, such as a generator or alternator, may be cooperatively implemented with a motor or engine controller, used to control the engine 102. In this embodiment, the term "controller" is meant to include one, two, or more controllers that may be associated with one another and that may cooperate in controlling various functions and operations of the engine 102. The functionality of the controller, while shown conceptually in the figures to include various discrete functions, may be implemented in hardware and/or software without regard to the discrete functionality shown. Accordingly, various interfaces of the controller are described relative to components of the engine 102. Such interfaces are not intended to limit the type and number of components that are connected, nor the number of controllers that are described.

Relevant to the present disclosure, the engine system 100 includes an intake manifold pressure sensor 191 and an intake manifold air temperature sensor 192 disposed to measure the pressure and temperature of incoming air to the engine and provide signals indicative of the measured parameters to the controller 190. As shown, the intake manifold pressure sensor 191 is disposed to measure air pressure within the intake manifold 120. The intake manifold air temperature sensor 192 is disposed to measure air temperature within the intake manifold 120. The engine system 100 further includes a barometric pressure sensor 193 that, as shown, is located at the air filter 125 and is disposed to measure and provide to the controller 190 a signal indicative of the barometric pressure and thus the altitude of engine operation. Similarly, the engine system 100 further includes an ambient air temperature sensor 196 that, as shown, is located at the air filter 125 and is disposed to measure and provide to the controller 190 a signal indicative of the ambient air temperature.

The engine system 100 additionally includes a cylinder pressure sensor 194, which is configured to measure and provide to the controller 190, in real time, a signal indicative of fluid pressure within the cylinder 106 into which the sensor is placed. Although one sensor is shown, it should be appreciated that more than one cylinder may have such a pressure sensor associated therewith. A timing sensor 195 provides a signal to the controller 190 that is indicative of the rotational position of the crankshaft and/or camshaft. Based on this information, the controller 190 can infer, at all times, the position of each intake and exhaust valve 118 and 132 as well as the position of each piston 110 within its respective cylinder 106. Additionally an EGR system usage signal can provide a signal to the control indicative of the use of the EGR system 169 and the amount of exhaust gas mixed with the intake air. This information can be used to control and adjust engine operation. The engine system 100 can further include an oxygen sensor 198 (not shown) typically disposed to measure the oxygen content in the exhaust gas of the engine or, alternatively, a difference between the amount of oxygen in the exhaust gas and the amount of oxygen outside of the engine system 100. Many other sensors associated with other engine components can include fuel pressure sensors 199 and 200 associated with the diesel fuel injector 144 and the gasoline fuel injector 156 respectively.

The controller 190 is further configured to provide commands to various actuators and systems associated with the engine 102. In the illustrated embodiment, the controller 190 is connected to the diesel and gasoline fuel injectors 144 and 156 and is configured to provide them with command signals that determine the timing and duration of fuel injection within the cylinders 106. The controller 190 further provides a timing phase command to the camshaft phase actuator 170 that dynamically adjusts valve timing during operation. The controller 190 can also provide a timing phase command to actuators 171, if present, to dynamically adjust the valve timing during operation. The controller 190 also provides commands to the EGR system 169. This can include at least commands to EGR valves 176 and/or 184. As shown, the controller 190 further provides commands that control the operation of the diesel and gasoline fuel conditioning modules 140 and 152 when either or both of these modules include functionality operating to change or adjust fuel properties, for example, by mixing additives that affect the cetane rating or otherwise determine the reactivity of the respective fuels.

An exemplary series of injection events for fuels having different reactivities that can be performed in accordance with one embodiment of the disclosure to provide stratified fuel/air mixture regions having different reactivities within a cylinder are shown in the cross sections of FIGS. 2-5. Beginning with FIG. 2, an initial fuel charge having a first, low reactivity, for example, gasoline, is injected into the variable volume 116 while the piston 110 is still undergoing an intake stroke or shortly after the intake stroke has been completed. Delivery of the first fuel into the variable volume 116 can be accomplished by dispersion of a gasoline plume 202 that is provided through the gasoline fuel injector 156 early enough to permit a somewhat uniform concentration of gasoline vapor throughout the variable volume 116. In an alternative embodiment, the first fuel may be mixed with intake air as the intake air enters the cylinder through the intake port. In the illustrated embodiment, gasoline injection can be performed at any time during and/or shortly after the intake stroke. As the illustrated embodiment operates using a Miller combustion cycle, operation of the intake valve 118 can be adjusted according to a LIC or EIC type of Miller operation, the extent of which is determined by the controller 190 on the basis of the operating conditions of the engine, for example, on the then-present engine speed and load conditions. After completion of the first injection shown in FIG. 2, sufficient time passes until a relatively uniform and homogeneous air/fuel mixture 204 (FIG. 3) having a first, relatively low reactivity occupies substantially the entire variable volume 116 of the cylinder.

The air/fuel mixture 204 having the first, relatively low reactivity is compressed at the early stage of a compression stroke while the piston 110 moves away from the BDC position and towards the TDC position, as shown in FIG. 3. As the illustrated embodiment operates using a LIC Miller combustion cycle, the intake valve 118 can remain open during the initial stage of the compression stroke. At around this stage, the second fuel, which has a higher reactivity such as diesel, is injected into the variable volume 116 through the diesel fuel injector 144. As shown, a diesel plume 206 is injected into the variable volume anywhere between the BDC position of the piston 110 (180 degrees of crankshaft rotation before TDC) and 10 degrees before the TDC position (0 degree position). During this period, two or more diesel injections may be provided. The injection shown in FIG. 3 is provided in about the first half of the compression stroke of the piston 110 while the piston is at a relatively greater distance from the flame deck surface such that the second injection plume 206 is directed towards the outer peripheral portions of the variable volume 116, which are sometimes referred to as the squish regions 207 when describing pistons having a bowl and a raised rim that "squishes" fluids in conjunction with the flame deck surface as the piston approaches the TDC position. These fuel injections can be carried out after the intake valve has closed so as to avoid egress of the second fuel into the intake manifold.

A third injection of high-reactivity fuel (here, diesel) is shown in FIG. 4, which depicts a position of about 30 degrees before TDC. The third fuel injection plume (second diesel plume) 208 of this injection event is directed primarily towards the inner portion of the piston bowl 111 because of the relative proximity of the piston 110 to the diesel fuel injector 144. In the time after the second injection was completed and before this third injection occurs, the second injection plume 206 (FIG. 3) has begun to diffuse or has already diffused from the squish region and mixes with the low-reactivity air/fuel mixture 204 from the fuel charge from the first fuel injection plume 202 (FIG. 2) to form a region 212 of intermediate reactivity at or near the squish region, as shown in FIG. 4. The second diesel plume 208 also begins to diffuse such that, after completion of this injection event and as the piston 110 continues to travel towards TDC, at least two additional regions having different reactivities are created.

As shown in FIG. 5, following completion of the third injection, the regions of intermediate reactivity 212 remain in the squish region, and a new region of intermediate reactivity 214 forms along a central portion of the bore, primarily by diffuse fuel from the third injection event near a tip of the diesel fuel injector 144. The fuel from the third injection event, i.e. the second diesel plume 208, has also formed a third region 216 having relatively high reactivity within the piston bowl. The third region 216 is formed primarily by evaporation of high reactivity fuel provided during the third injection event within the relatively enclosed space of the piston bowl.

Overall, the variable volume 116 at the position near TDC as shown in FIG. 5 includes regions having three different reactivities, which are stratified relative to one another: (1) the background region made up from the air/fuel mixture 204 that occupies substantially the entire variable volume 116, which has a relatively low reactivity provided by the initial fuel injection charge 202 (FIG. 2) that has now substantially diffused, (2) the second and third regions 212 and 214 disposed in the squish region and along the central portion of the volume 116 that have intermediate reactivity, which were created by the second and third injection events, and (3) the relatively high reactivity region 216 that is disposed substantially within the piston bowl and was created after the third injection event. Combustion may begin at around this time at the high reactivity region 216 and propagate over time to the intermediate and lower reactivity regions 204, 212 and 216.

Figure 6:
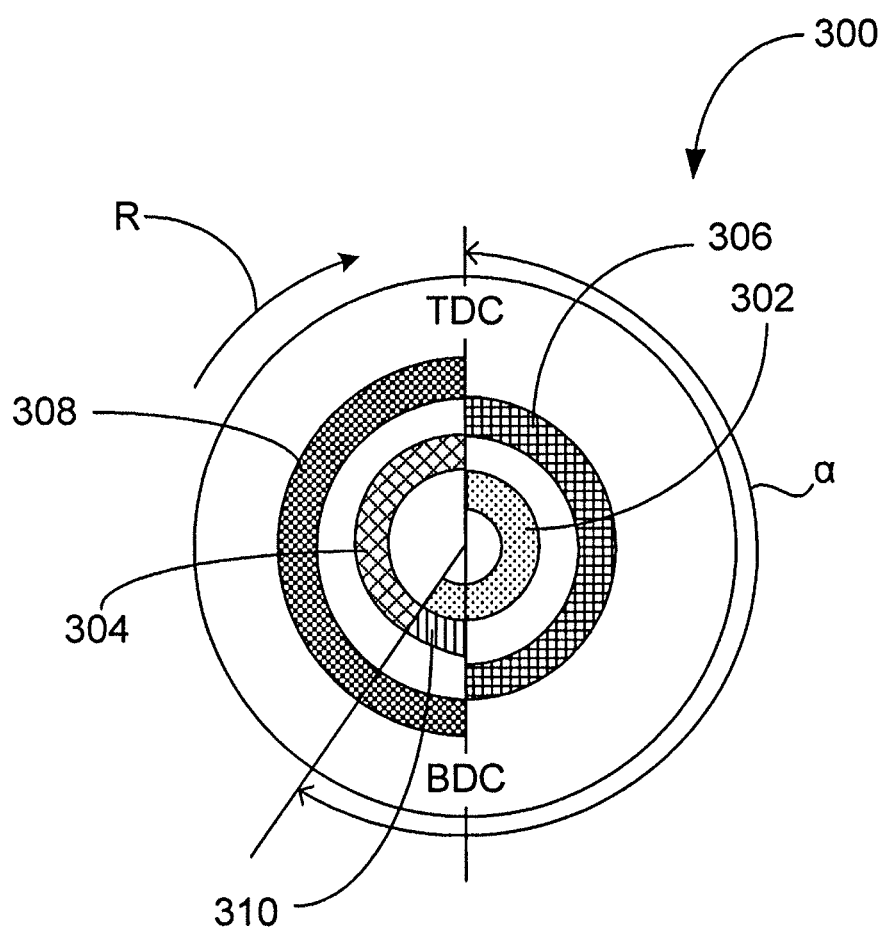
FIG. 6 is a qualitative chart illustrating various engine operating conditions in accordance with the disclosure.

In the illustrated embodiment, the engine 102 can be operating under a LIC Miller thermodynamic cycle, in which the intake valve 118 is kept open after the piston 110 has passed its BDC position, or alternatively under an EIC Miller thermodynamic cycle, in which the intake valve 118 closes early during the intake stroke and before the piston reaches the BDC position. To illustrate operation under the LIC Miller cycle, a qualitative valve timing chart 300 is shown in FIG. 6. Although typical valve timing charts are configured based on the particular structures of each engine, the chart 300 is shown simplified and without valve lead, lag, or overlap effects for simplicity.

The chart 300 represents various intake and exhaust valve opening events with respect to the rotation of the engine's crankshaft, which is viewed from the front as it rotates in the direction of the arrow, R. Accordingly, TDC is shown at the top of the chart 300 and represents the crankshaft position (0 degrees) at which the piston 110 is at the topmost position in the cylinder 106 as shown in FIG. 2. Similarly, BDC is shown at the bottom of the chart 300 and represents the position at which the piston 110 is at the bottommost position in the cylinder 106 (180 degrees). In the chart, an intake stroke 302 extends from TDC, at which point the intake valve 118 is assumed to instantaneously open for purposes of the present disclosure, to an angle belonging in the range of about 1 to 100 degrees before or after BDC over an angle, $\alpha$ (alpha), which is generically illustrated. The compression stroke 304 begins after the intake valve 118 has closed, which in the present discussion is assumed to occur instantaneously, and extends up to TDC. A combustion or power stroke 306 immediately follows until about the BDC piston position, and is followed by an exhaust stroke 308 during which the piston travels back towards the TDC position. The initiation of the power stroke 306 can be selectively advanced or retarded by permitting auto-ignition to occur in a compression ignition engine by creating appropriate conditions within the combustion cylinder. Relative to the present disclosure, one of the factors affecting the initiation of combustion within the engine cylinders is the temperature of the various air/fuel mixtures that are present the cylinder prior to combustion. The latent heat of vaporization of water condensing within the EGR system, as well as the temperature and amount of recirculated EGR gas, is used in the described embodiments to provide the improved ability of selectively lowering the temperature of in-cylinder fluids such that combustion may initiate when desired.

As shown by the shaded area 310 in the chart 300, in accordance with the LIC Miller cycle, the opening and closing of the intake valve prolongs the intake stroke 302 past the BDC position, which delays the compression stroke 304. It should be appreciated that in an early intake closing ("EIC") type of Miller cycle, the valve timing chart would be different.

The actuation of the intake valve 118 is advantageously variable based on other engine operating and environmental conditions such that engine operation may be optimized under most operating conditions. The controller 190 can determine the actual combustion process performance and engine operating parameters through the sensors and controls. For example, ignition timing and combustion rate are two factors determined in part by the relative reactivities and stratification between the two fuels. These two parameters may also affect other engine operating parameters such as emissions, noise, heat rejection and others. The ignition timing can be determined by monitoring signals provided by various engine sensors. For example, the initiation of combustion can be detected by monitoring a signal from the cylinder pressure sensor 194 for a rate of increasing cylinder pressure that exceeds a threshold rate of increase, combustion duration and/or combustion rate can be monitored by comparing a cylinder pressure signal with a predetermined cylinder pressure trace, and so forth. The timing of these events can also be correlated with engine timing by monitoring, in real time, camshaft and/or crankshaft rotation using the appropriate system sensors as previously described.

Based on these and other combustion parameters, the timing of the power stroke 306 can be selectively controlled in the engine system 100. The duration of the intake stroke 302 and/or the initiation of the combustion stroke 306 are parameters that can be actively controlled in the engine 102. Such control is effective in improving fuel economy, compensating for different fuel types, reducing emissions, and generally providing other advantages to the operation of the engine 102 as is described in further detail in the paragraphs that follow. Control over the timing of these events can be made using in-cylinder temperature and air/fuel ratio composition and stratification as primary control parameters. Relative to the present disclosure, adjustment of in-cylinder fluid temperature using the latent heat of vaporization of water condensing in the EGR system by adjusting the EGR rate and thus controlling the amount of water thus provided is the primary focus.

Further, because the ignition timing and combustion rate are determined in part by the relative reactivity ratios and reactivity stratification, the controller 190 can further control and adjust the combustion process by varying the relative reactivity ratio or reactivity stratification. This can be accomplished in any suitable way including, for example: (1) changing the relative quantities or amounts introduced of the first fuel having the first reactivity with respect to the second fuel of the second reactivity; (2) changing the timing of introduction of the first fuel with the first reactivity and/or the second fuel having the second reactivity.

Additionally, because usage of the EGR system 169 can also affect the combustion processes, the controller 190 can be configured to balance or correlate the two processes to improve engine performance. In particular, the intake air/exhaust gas ratio can be adjusted by: (1) introducing more exhaust gas or (2) introducing more intake air. Additionally the exhaust gas properties can change as operating conditions change. For example, in operating environments having high humidity, incoming air to the engine will bring with it moisture that may will condense in the EGR system in addition to moisture generated through the combustion process.

Generally, the engine will compensate for higher intake air temperatures by reducing the amount of Miller and/or increasing the usage of the EGR system. The valve timing, amount and timing of fuel injections, and the amount of EGR system usage can be optimized such that stable ignition control can be attained regardless of environmental conditions for a particular engine system.

Figure 7:
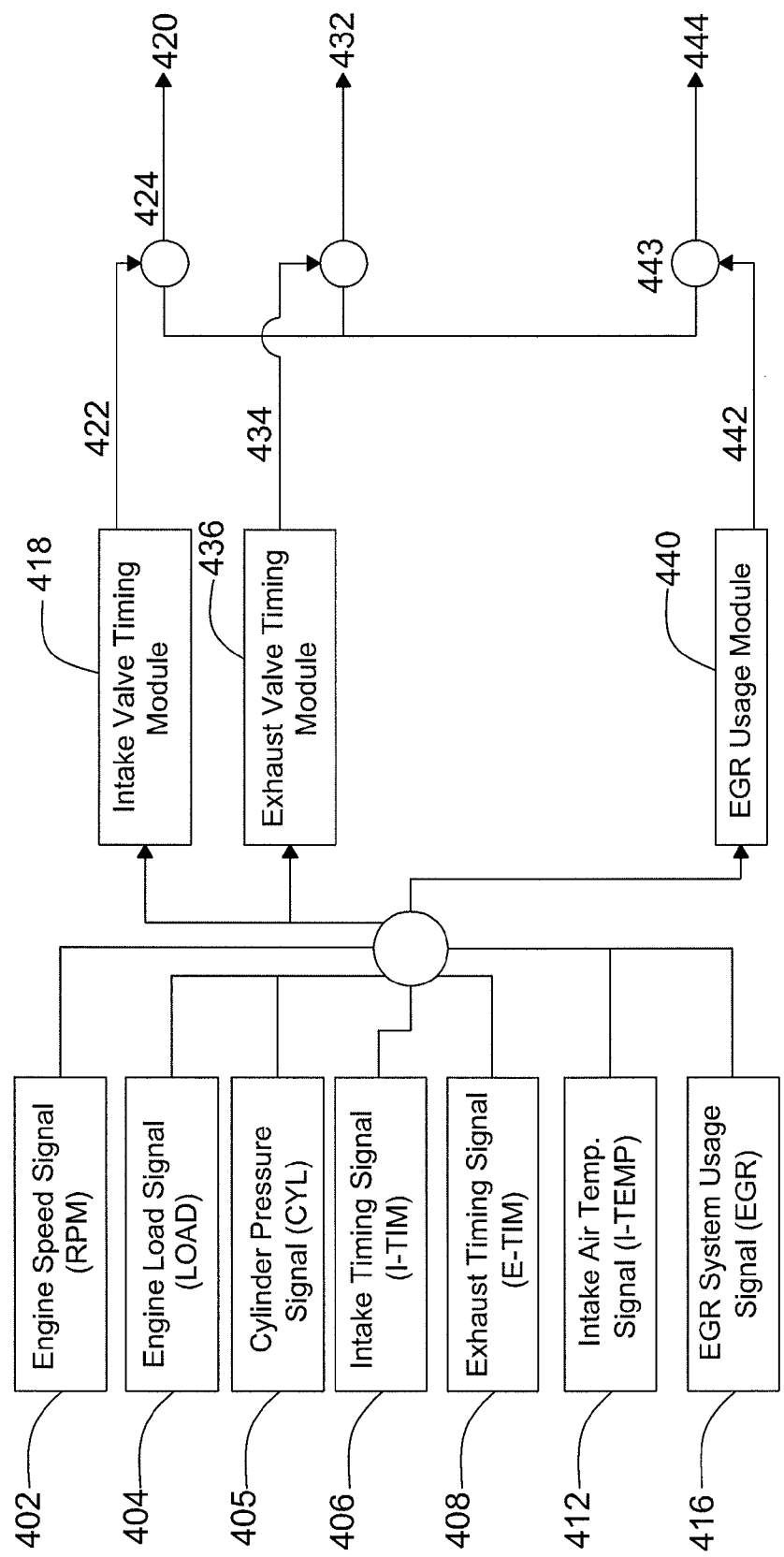
FIG. 7 is a block diagram for an engine controller in accordance with the disclosure.

A block diagram showing one embodiment of some of the inputs to the controller 190 is shown in FIG. 7. As shown, the controller 190 is disposed to receive various inputs indicative of engine operating parameters and other parameters. Specifically, among the various signals that the controller 190 receives are an engine speed signal (RPM) 402, an engine load signal (LOAD) 404, which may be expressed as a torque applied to the engine, a cylinder pressure signal (CYL-P) 405, an intake valve timing signal (I-TIM) 406, an exhaust cam timing signal (E-TIM) 408, EGR system usage signal (EGR) 416, and other parameters that are not shown here, such as intake manifold pressure, exhaust pressure, engine oil or coolant temperature, ignition timing and the like. Of the illustrated signals, the RPM 402 may be provided as an engine speed value in revolutions per minute, or it may alternatively be provided as a raw series of pulses from the crankshaft position sensor, which are then used to derive the engine speed. The LOAD 404 may be provided directly by a load sensor (not shown), or it may alternatively be calculated indirectly from other parameters, such as the current and voltage output of a generator or alternator connected to the engine (not shown), a pressure and flow of hydraulic fluid provided by a fluid pump connected to the engine (not shown), an estimated or measured transmission torque, or any other appropriate parameters indicative of the load applied to the engine during operation. The CYL-P 405 may be provided by the cylinder pressure sensor 194. The I-TIM 406 and E-TIM 408 may be provided from position sensors associated with the intake valve 118 and exhaust valve 132, actuators or camshaft 162 associated with the intake and exhaust valves of the engine such as the timing sensor 195. The EGR system usage signal 416 may be provided by sensors 197 connected to the low-pressure EGR system 182 and/or the high-pressure EGR system 172

The controller 190 includes an intake valve timing module 422, which receives at least an intake valve timing signal 406, the load 404, and the engine speed 402. The intake valve timing module 418 performs calculations to provide an intake valve phase signal 420. The intake valve phase signal 420 may be the same as or provide a basis for determination of a signal controlling the operation of a phaser device, for example, the camshaft phase actuator 170 or actuators 171. Although any suitable implementation may be used for the intake valve timing module 418 the intake valve timing module 418 can include a lookup table that is populated by valve timing values or valve phase signals that are tabulated against engine speed 402, engine load 404, and any other parameters. The timing values in the table are arranged to provide timing advance or retard, depending on the desired conditions.

Thus, the table receives the engine speed 402 and load 404 and other operating parameters during operation, and uses these parameters to lookup, interpolate, or otherwise determine a desired intake timing value. The desired intake timing value is compared to the actual intake timing 406. The intake timing error is provided to a control algorithm, which yields an intake valve timing command signal 422. The control algorithm may be any suitable algorithm such as a proportional-integral-derivative (PID) controller or a variation thereof, a model based algorithm, a single or multidimensional function and the like. Moreover, the control algorithm may include scheduling of various internal terms thereof, such as gains, to enhance its stability.

In engines having separate intake and exhaust valve camshafts, the controller 190 may be further configured to provide a separate exhaust valve phase signal 432. The exhaust valve phase signal 432 in the embodiment illustrated is determined in a fashion similar to that of the intake valve phase signal 422. Accordingly, the exhaust valve phase signal 432 is determined by an altitude and temperature compensated exhaust valve timing signal 434 that is provided by an exhaust valve timing module 436. The exhaust valve timing module 436 receives as inputs the engine speed 402 and load 404 as well as the exhaust valve timing 408. The exhaust valve timing module 436 may operate similar to the intake valve timing module 418 and include similar elements and algorithms.

Like the timing adjustments above, the controller 190 can also adjust the use of the EGR systems 172 or 182 in response to operating conditions. The controller 190 includes an EGR usage module 440 which receives at least the EGR system usage 416, the load 404, the engine speed 402, and in some embodiments the oxygen signal 417. The EGR usage module 440 performs calculations to provide an EGR usage signal 442. The EGR usage signal 442 may be the same as or provide a basis for determination of a signal controlling the operation of the EGR systems 172 or 182. Although any suitable implementation may be used for the EGR usage module 440 the EGR usage module 440 can include a lookup table that is populated by EGR usage values that are tabulated against engine speed 402, engine load 404, and any other parameters. The EGR usage values in the table are arranged to provide EGR usage increase or decrease, depending on the desired conditions.

Thus, the table receives the engine speed 402 and load 404 and other operating parameters during operation, and uses these parameters to lookup, interpolate, or otherwise determine a desired EGR valve command signal 444. The desired EGR valve command signal is compared to a measured or otherwise determined EGR usage signal 416, which may include an EGR valve position signal, a signal indicative of EGR flow through the EGR system that is measured directly, for example, by a flow sensor disposed inline with the EGR system, or indirectly, for example, by monitoring the air incoming to the engine and comparing it with a theoretical engine airflow rate that is based on a physical parameter such as volumetric efficiency. Relevant to the present disclosure, the EGR usage module 440 also receives information about the engine combustion process as well as the state of other engine systems such as the intake and exhaust valve timing. Information about the engine combustion process can be provided, for example, via the cylinder pressure sensor 194, the signals from which can be monitored to determine cylinder ignition time, combustion duration, and other parameters.

On the basis of the information provided, with ignition timing information being a primary control parameter, the EGR usage module determines a desired EGR rate for the engine. The desired EGR rate thus calculated encompasses not only emissions considerations for the engine, but is also suitable to achieve desirable combustion characteristics. In one embodiment, EGR usage for base engine emissions may be accomplished through the HPL EGR system 172, while EGR usage for controlling intake air temperature through utilization of the latent heat of vaporization of condensed water may be accomplished by use of the LPL EGR system 182, when both systems are present on the engine. Alternatively, either of the two systems can fulfill both functions.

For illustration, the controller 190 is configured to control ignition timing by adjusting both primary and secondary parameters. Primary parameters include fuel injection timing, fuel quantity, fuel ratio, intake and/or exhaust valve timing, and other parameters including EGR, which are originally set at calibrated, predetermined values based on the desired engine operating speed and load. Detection of ignition timing may cause changes to fewer or all of these parameters in an attempt to achieve stable combustion. However, in certain extreme environmental conditions, for example, during operation in excessively high temperature and low humidity positions, or at high altitude, there may be excessive heat present in the cylinder, which may in turn cause premature ignition of the stratified air/fuel mixture.

When excessive heat in the cylinder is detected, for example, by monitoring intake manifold temperature and/or by detecting premature combustion in the cylinders, the EGR usage module 440 adjusts the rate of EGR that is commanded, for example, by adjusting the EGR valve command signal. A desired setting for the EGR valve can be determined on the basis of engine speed and load, as well as on the timing signal. When ignition timing is to be advanced, the EGR rate through the LPL EGR system may be increased to thus increase the ingress of water condensing in that system into the intake of the engine. The increased ingress of water causes the evaporation of that water within the intake air stream of the engine, thus cooling the intake air stream and thus also cooling the air or exhaust/air moisture provided to the engine cylinders. Similarly, intake air that is sufficiently cool may cause a decrease in the amount of gas that passes through the LPL EGR system.

When a desired EGR rate has been determined within the EGR usage module 400, an error between the desired and actual EGR rates is calculated and provided to a control algorithm, which yields an EGR usage command signal 442. The control algorithm may be any suitable algorithm such as a proportional-integral-derivative (PID) controller or a variation thereof, a model based algorithm, a single or multidimensional function and the like. Moreover, the control algorithm may include scheduling of various internal terms thereof, such as gains, to enhance its stability. The EGR command signal 442 is optionally compensated by the addition of compensation terms at a junction 443 to provide an EGR final command signal 444.

The controller 190 also includes a fuel control module 450 (not shown) that can control the injection timing and duration of the fuel injectors 144 and 156 of the reactivity compression controlled ignition engine 102. The fuel control module can receive any number of inputs including the engine speed signal (RPM) 402, the engine load signal (LOAD) 404, the cylinder pressure signal (CYL-P) 405, the intake valve timing signal (I-TIM) 406, the exhaust cam timing signal (E-TIM) 408, the intake temperature signal (I-TEMP) 412, the EGR system usage signal (EGR) 416, and other parameters, such as intake manifold pressure, exhaust pressure, engine oil or coolant temperature, ignition timing and the like. From these inputs and based on desired operating conditions such as desired engine speed and desired engine load the fuel control module can control the timing and duration of the fuel injectors 144 and 156 to control the timing and amount of gasoline and diesel fuel that are injected into each of the cylinders 106. The injection timing and amount of each of the fuels can affect the ignition of the reactivity controlled compression ignition engine and can be varied to meet the appropriate operating conditions.

INDUSTRIAL APPLICABILITY

The present disclosure is applicable to internal combustion engines and, more particularly, to engines operating with more than one fuel using a variable Miller cycle and a variable EGR system. A flowchart for a method of operating a such a system is shown in FIG. 8.

Figure 8:
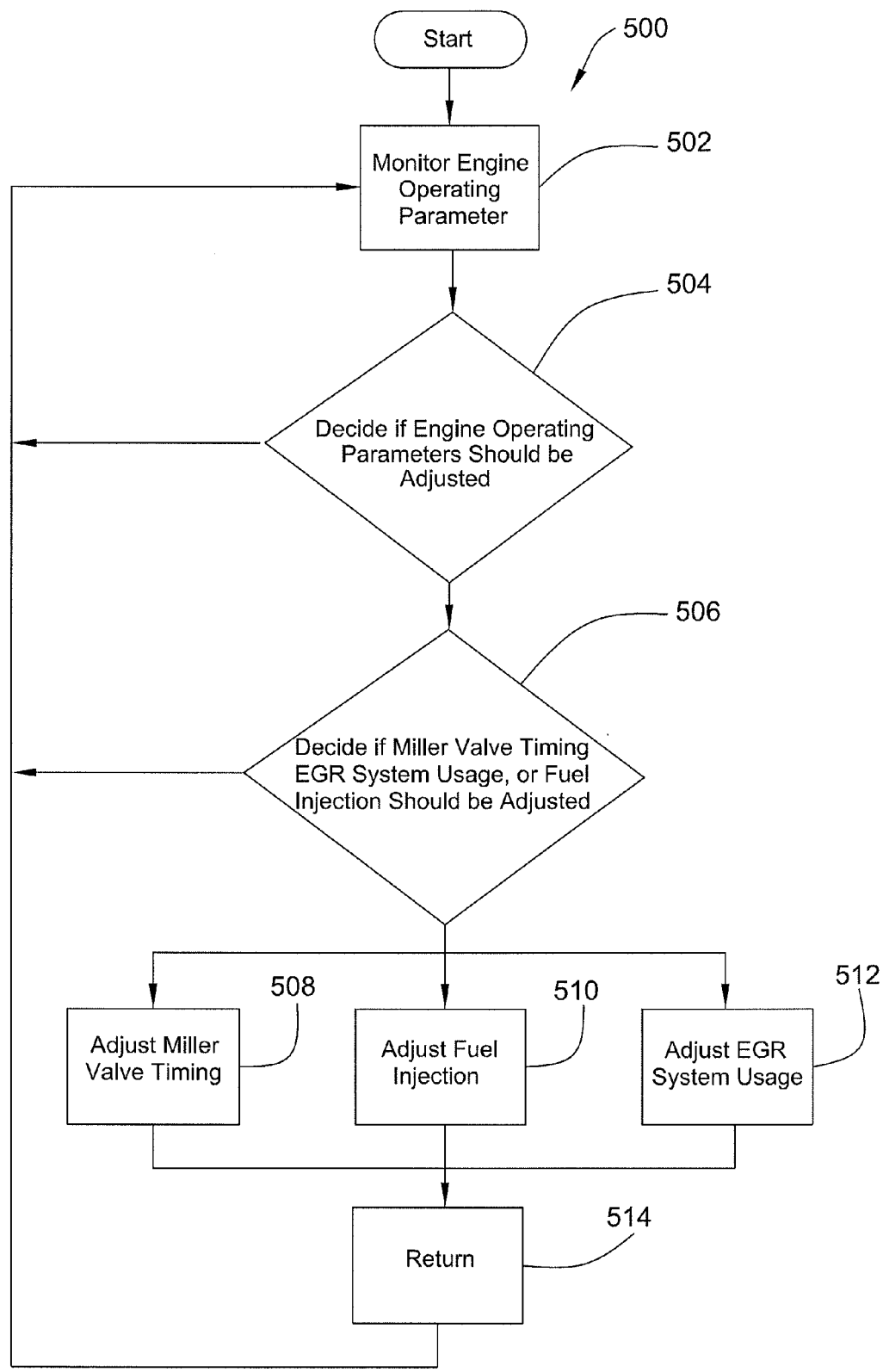
FIG. 8 is a flowchart for a method in accordance with the disclosure.

Referring to FIG. 8, there is illustrated a flowchart of an internal control system 500 that can be performed by an electronic controller and used with an engine system using both RCCI combustion operating on a Miller Cycle and a variable EGR system. In the first monitoring step 502, the controller measures at least one operating parameter reflective of the dual reactivity combustion process occurring in the combustion chambers. The operating parameter can be, for example, cylinder pressure, intake temperature, engine speed, engine load, or any number of other engine operating parameters. The controller uses the measured operating parameter and possibly other information to assess various combustion conditions such as ignition timing, combustion rate, or valve timing. In a first decision step 506, the controller can decide based on the previously determined conditions whether an adjustment to the engine operating parameters should be made to improve engine operation. For example, it may be appropriate to attempt to reduce engine emissions, increase thermal efficiency, change valve timing, adjust fuel injection timing and amount, or adjust cooler usage. If no adjustment is required, the control system may just return to the monitoring step 502.

If the controller determines there is a need for adjustment, then another decision step 506 can determine if either the Miller cycle valve timing should be adjusted, the fuel injection timings and amounts should be adjusted, the EGR system should be adjusted, or a combination of any of these. If it is determined to adjust the Miller valve timing, in a subsequent first instruction step 508 the controller can issue an appropriate instruction or command to the intake and exhaust valves to adjust the timing accordingly. If it is determined to adjust the fuel injection timing or amounts of either fuel, in a second instruction step 510 the controller can send an appropriate command to the fuel injectors to adjust the amount or the timing of the fuel introductions to the cylinders. If it is determined to adjust the EGR system, in a third instruction step 512 the controller can send appropriate commands to the EGR system to adjust the usage of the EGR system. In a subsequent return step 514, the control system 500 can return the monitoring step 502 to determine and assess the effect of the adjustments. It will be appreciated that the control system can be run continuously to provide a closed looped feedback system for continuously adjusting operation of the engine system.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:
1. An internal combustion engine, comprising:
   at least one cylinder having a piston reciprocable between top dead center (TDC) and bottom dead center (BDC) positions;
   at least one intake valve associated with the at least one cylinder, the at least one intake valve being configured to open and close and having an intake valve timing asso- ciated with such opening and closing, wherein the intake valve operates in accordance with a Miller thermodynamic cycle;

an intake system directing intake air to the at least one intake valve;

an exhaust system directing exhaust gasses from the at least one cylinder;

a first fuel injector disposed to inject a first fuel into said cylinder;

a second fuel injector disposed to inject a second fuel into said cylinder;

a high pressure loop (HPL) exhaust gas recirculation (EGR) system and a low pressure loop (LPL) EGR system, each of the HPL and LPL EGR systems disposed to draw exhaust gas from the at least one cylinder and provide an amount of exhaust gas recirculation to the at least one intake valve;

wherein the first fuel injector delivers a first injection of first fuel into the at least one cylinder; and wherein the second fuel injector delivers a second injection of second fuel and a third injection of second fuel into the at least one cylinder at different times such that a stratified mixture is formed in the at least one cylinder that includes first, second and third regions of different reactivities, the first region including a mixture of air and the first fuel, the second region containing a mixture of air, the first fuel and the second fuel and being disposed around a peripheral portion of the at least one cylinder, and the third region containing a mixture of air, the first fuel and the second fuel and being disposed around a central portion of the at least one cylinder;

at least one sensor monitoring at least one engine operating parameter indicative of an ignition timing of the internal combustion engine; and an electronic controller disposed to:
receive at least one input signal from the at least one sensor indicative of the ignition timing,
determine a desired amount of EGR that should pass through the HPL EGR system and the LPL EGR system based at least on an engine operating speed and an engine operating load; and
determine an adjustment to the desired amount of EGR passing through the LPL EGR system based on said at least one input signal as an input parameter such that, when ignition timing is advanced, the desired amount of EGR passing through the LPL EGR system is caused to increase, and when ignition timing is retarded, the desired amount of EGR passing through the LPL EGR system is caused to decrease.

2. The engine of claim 1, wherein the first fuel has a different fuel reactivity than the second fuel.

3. The engine of claim 2, wherein the first fuel injector introduces the first fuel at a first time such that the first fuel mixes with intake air in the at least one cylinder and wherein the second fuel injector introduces the second fuel charge at a second time such that the second fuel charge forms stratified regions in the at least one cylinder.

4. The engine of claim 1, configured to activate the first fuel injector to inject the first fuel during an intake-compression cycle forming a first region; and to activate the second injector to introduce the second fuel later in the intake-compression cycle to form a second region.

5. The engine of claim 4, wherein the first region has a different fuel reactivity than the second region.

6. The engine of claim 4, wherein the first fuel is gasoline and the second fuel is diesel, and wherein a combustion that occurs in the at least one cylinder is a reactivity controlled compression ignited combustion.

7. The engine of claim 1, wherein the at least one input signal includes at least one of engine speed, engine load, ignition timing, intake air temperature, cylinder air pressure, and cylinder air temperature.

8. The engine of claim 1, wherein the at least one exhaust gas recirculation system is a low-pressure exhaust gas recirculation system.

9. The engine of claim 1, wherein the at least one exhaust gas recirculation system includes an intercooler.

10. The engine of claim 9, wherein the at least one exhaust gas recirculation system includes a condensation dispersion device downstream of the intercooler.

11. A method for operating an internal combustion engine, comprising:
storing a first fuel in a first fuel reservoir, the first fuel having a first reactivity;
storing a second fuel in a second fuel reservoir, the second fuel having a second reactivity;
mixing via an exhaust gas recirculation (EGR) system a portion of exhaust gas with intake air to provide an intake air/exhaust gas mixture, wherein mixing is accomplished selectively through a high pressure loop (HPL) exhaust gas recirculation (EGR) system and also through a low pressure loop (LPL) EGR system, each of the HPL and LPL EGR Systems disposed to draw exhaust gas from at least one engine cylinder and provide an amount of EGR mixed with air back to at least one cylinder;
introducing the intake/exhaust gas mixture to a variable volume defined by a piston moving in a cylinder;
introducing the first fuel into the variable volume at a first time;
introducing the second fuel having a second reactivity into the variable volume at a second time, wherein the piston is closer to a bottom dead center (BDC) position at the first time than at the second time;
introducing the second fuel at a third time such that a stratified mixture is formed in the variable volume that includes first, second and third regions of different reactivities, the first region including a mixture of air and the first fuel, the second region containing a mixture of air, the first fuel and the second fuel and being disposed around a peripheral portion of the variable volume, and the third region containing a mixture of air, the first fuel and the second fuel and being disposed around a central portion of the variable volume;
combusting the first, second and third fuel charges in the variable volume;
receiving operating parameters at an electronic controller, the operating parameters being indicative of an ignition timing of the internal combustion engine;
processing the operating parameters in the electronic controller to determine at least one of a desired amount of the first fuel, a desired amount of the second fuel, a desired valve timing, and a desired amount of the portion of exhaust gas,
determining a desired amount of EGR through the HPL EGR system and the LPL EGR system based at least on an engine operating speed and an engine operating load; and
determining an adjustment to the desired amount of EGR passing through the LPL EGR system based on the ignition timing as an input parameter such that, when ignition timing is advanced, the desired amount of EGR passing through the LPL EGR system is caused to increase, and when ignition timing is retarded, the desired amount of EGR passing through the LPL EGR system is caused to decrease.

12. The method of claim 11, further comprising:
operating the engine at an engine valve timing in a fashion consistent with a Miller thermodynamic cycle.

13. The method of claim 11, further comprising:
condensing and re-entraining liquid from the EGR system into the intake air to provide the intake air/exhaust gas mixture.

14. The method of claim 11, wherein the first reactivity is different from the second reactivity.

15. The method of claim 11, wherein the first fuel is gasoline and the second fuel is diesel.

16. The method of claim 11, wherein the first fuel forms a first region in the cylinder and the second fuel forms a second region in the cylinder, wherein the first region has a different reactivity than the second region.

17. The method of claim 11, wherein the processing of the operating parameters involves determining at least one of the desired amount of the first fuel, the desired amount of the second fuel, the desired valve timing, and the desired amount of the portion of exhaust gas based on a then-present engine speed and engine load.

18. A method for operating an internal combustion engine in a fashion consistent with a Miller thermodynamic cycle, comprising:
storing a first fuel in a first fuel reservoir, the first fuel having a first reactivity;
storing a second fuel in a second fuel reservoir, the second fuel having a second reactivity;
mixing via a high pressure loop (HPL) exhaust gas recirculation (EGR) system and also via a low pressure loop (LPL) EGR system a portion of exhaust gas with intake air and condensing and re-entraining liquid from the LPL EGR system into the intake air to provide an intake air/exhaust gas mixture;
introducing the intake/exhaust gas mixture to a variable volume defined by a piston moving in a cylinder;
performing a first injection in which the first fuel is introduced into the variable volume at a first time;
performing a second injection in which the second fuel is introduced into the variable volume at a second time, wherein the piston is closer to a bottom dead center (BDC) position at the first time than at the second time;
performing a third fuel injection in which an additional amount of the second fuel is introduced into the variable volume at a third time, such that a stratified mixture is formed in the variable volume that includes first, second and third regions of different reactivities, the first region including a mixture of air and the first fuel, the second region containing a mixture of air, the first fuel and the second fuel and being disposed around a peripheral portion of the variable volume, and the third region containing a mixture of air, the first fuel and the second fuel and being disposed around a central portion of the variable volume;
combusting the first, second and third fuel injection charges in the variable volume;
receiving operating parameters at an electronic controller, the operating parameters being indicative of an ignition timing of the internal combustion engine;
processing the ignition timing in the electronic controller to determine at least one of a desired amount of the first fuel, a desired amount of the second fuel, a desired valve timing, and a desired amount of the portion of exhaust gas,
determining a desired amount of EGR through the HPL EGR system and the LPL EGR system based at least on an engine operating speed and an engine operating load; and
determining an adjustment to the desired amount of EGR passing through the LPL EGR system based on the ignition timing as an input parameter such that the desired amount of EGR passing through the LPL EGR system is caused to increase when ignition timing is advanced, and the desired amount of EGR passing through the LPL EGR system is caused to decrease when retarding ignition timing.

19. The method of claim 18, further comprising:
increasing the portion of exhaust gas mixed with the intake air in response to the ignition timing.

20. The method of claim 18, further comprising:
decreasing the portion of exhaust gas mixed with the intake air in response to the ignition timing.

21. The method of claim 18, further comprising:
performing a third injection in which an additional amount of the second fuel is introduced into the variable volume at a third time, wherein the piston is closer to the BDC position at the second time than at the third time;
wherein a portion of the second fuel injected during the second injection creates the second region in a squish region of the variable volume;
wherein a portion of the second fuel injected during the third injection creates the third region along a central portion of the variable volume that is disposed near a tip of a fuel injector injecting the second fuel into the variable volume; and
wherein a reactivity of the second region is less than a reactivity of the third region.

* * * * *